United States Patent

[11] 3,582,534

[72] Inventor Harry C. Anderson
 Stratford, Colo.
[21] Appl. No. 761,614
[22] Filed Sept. 23, 1968
[45] Patented June 1, 1971
[73] Assignee General Electric Company

[54] STRESS CASCADE-GRADED CABLE TERMINATION
 8 Claims, 3 Drawing Figs.
[52] U.S. Cl. .................................... 174/73R,
 174/127, 324/54
[51] Int. Cl. ...................................... H02g,15/02
 G01r 31/12
[50] Field of Search ........................... 174/73,
 73.1, 127; 324/54; 310/196

[56] References Cited
 UNITED STATES PATENTS
 1,667,743 5/1928 Sievert et al. ................ 174/73
 1,868,962 7/1932 Atkinson ..................... 174/73
 3,396,231 8/1968 Anderson .................... 174/73

OTHER REFERENCES
Meyn, German printed application No. 1,160,938, published Jan. 9, 1964. Copy in 174-73(.1).

Primary Examiner—Laramie E. Askin
Attorneys—R. Jonathan Peters, Frank L. Neuhauser, Oscar B. Waddell and Melvin M. Goldenberg ABSTRACT: Electric-cable-terminating means for substantially inhibiting ionization at the termini in which semiconductive coatings are applied in a cascade arrangement, relative to resistance per square, onto the insulation layer for a predetermined length from the high-voltage output end to establish electrical contact with the ground-shielding means. Each coating has a predetermined resistance per square different in value from an adjacent coating, or coatings, and cascaded progressively upward in value from the ground-shielding means so that the coating adjacent the shielding means has the lowermost value. The cascaded coatings have a predetermined resistance per square sufficient so that the electrical stress at the surface for said length does not exceed the ionization start level of the cable.

INVENTOR
HARRY C. ANDERSON
BY R. Jonathan Peters
ATTORNEY

STRESS CASCADE-GRADED CABLE TERMINATION

In a typical high-voltage cable, a semiconducting layer or tape is applied around the metal conductor, and an insulation layer is extruded over this surface. A ground-shielding means is then concentrically disposed over the insulation, which usually comprises a semiconducting layer and a metallic return shield. The semiconducting layer, for example, may be a nylon tape impregnated with carbon black, or may be polyethylene or butyl rubber having incorporated therein carbon black and extruded over the conductor. The metallic return shield for returning current may be copper, or tinned copper, wrapped around the semiconducting layer or may be a copper braid concentrically disposed over said semiconducting layer. The structure may be further enclosed by a jacketing material such as a polyvinyl chloride layer or a metallic jacket. In the cable construction, it is important to eliminate or minimize any voids, such as in the insulation or at the interfaces, which potentially are a source of breakdown. That is, under high-voltage conditions encountered, the voids may ionize thereby leading to the eventual breakdown of the cable.

Cable is tested for voids by an ionization level test. According to this test, at each terminal of the cable the ground-shielding means is stripped back to expose the insulation layer. The edge of the ground-shielding means is cut uniformly and carefully to avoid nicking the insulation. The raw edge of the ground-shielding means is then taped to provide a tight fit to the insulation. There should be no gaps between the ground-shielding means and insulation, and there should be no protruding points or tips extending from the ground-shielding means. A cup containing mercury, insulated from ground, is immersed into a tank of oil, and one or both terminals are then inserted into the mercury. Voltage is applied through the mercury cup to the cable, and the voltage is increased until ionization occurs. The voltage level at which ionization occurs in the cable coincides with the visual display on an oscilloscope or other suitable instrument.

One distinct disadvantage with the oil termination is that the semiconducting layer is attacked or dissolved by the oil thereby releasing the carbon black, or other conductive component. Consequently, the contaminated oil conducts current which gives a false ionization reading. This will be interpreted as a cable failure when in fact it may be a terminal failure.

U.S. Pat. No. 3,396,231, assigned to the same assignee as this application, discloses an electric-cable-terminating means substantially eliminating or inhibiting ionization at the terminus, while overcoming the disadvantages of the prior art. However, I have found that the terminating means of that patent may be used with cable having a voltage rating up to about 35 kv., or slightly higher; but, when employed with cable having a substantially higher voltage rating, flashover occurs as a result of overheating. It is the purpose of the present invention, therefore, to provide an electric-cable-terminating means substantially eliminating or inhibiting ionization at the terminus, especially for cable having a voltage rating substantially higher than 35 kv.

In an insulated cable such as of the type described above, at or near the termini a high-voltage concentration exists along the edge of the grounded shield which results in ionization or corona discharge. It is known that this ionization may be reduced or minimized by applying a semiconductive coating onto the grounded shield and over a portion of the insulation layer. The coating has a nonlinear current characteristic, and a nonlinear capacitive current is introduced along the coated portion. As a result, a voltage distribution occurs which results in a substantially linear voltage drop along the insulation layer thereby diminishing the stress concentration near the grounded shield. Hence, the electric field at the termination of the cable is rendered more uniform thereby reducing or substantially eliminating ionization at the terminal. According to my invention, a linear resistive current is introduced to the environment which is sufficiently larger in magnitude than the capacitive current to overmask the latter and thereby approach a substantially linear current.

The invention, together with its objects and advantages, will best be understood by referring to the following detailed specification, and to the accompanying drawings, in which.

Figure 1:
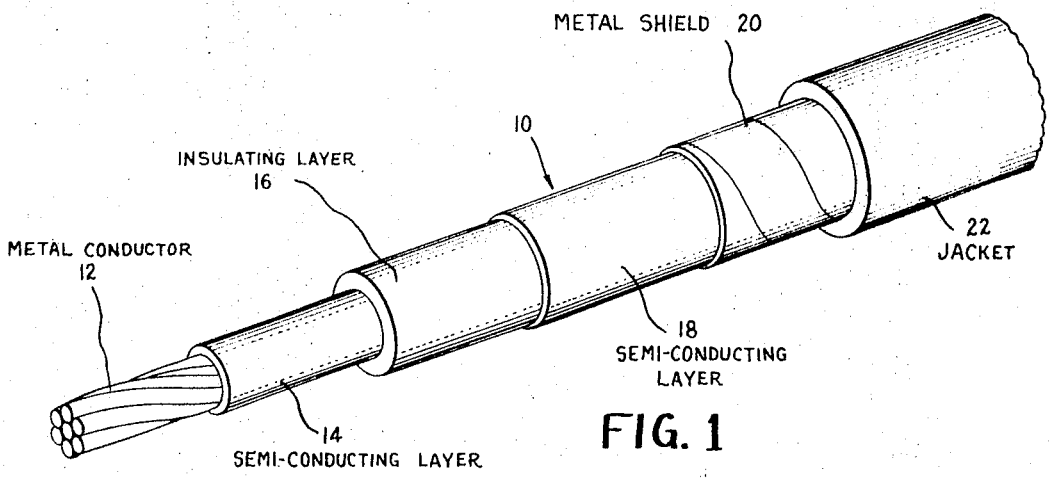
FIG. 1 is a perspective view of a cable of typical construction with portions thereof cut away for the purpose of better illustrating its construction.

In a broad aspect of the invention, I provide cable-terminating means characterized by substantially no ionization by applying in a cascade arrangement semiconductive coatings onto the insulation layer of the cable from the high-voltage output end at the terminus to the ground-shielding means. In this manner, electrical contact is established between the high-voltage output end (i.e., conductor) and the shielding means. The coatings extend over the insulation of the cable for a predetermined distance or length, sometimes referred to herein as the termination length and explained hereinbelow in greater detail. Each coating material is characterized by a resistance per square different in value from another and from an adjacent coating, or coatings, and cascaded progressively upward in value from the shielding means so that the coating adjacent and in electrical contact with the shielding means has the lowermost value. The cascaded coatings have a predetermined resistance per square such that the electrical stress or transverse voltage gradient at any point on the termination does not exceed the ionization level of the cable. It will be observed that a nonlinear capacitive current is established caused by the capacitive effect of the semiconductive coatings on the insulation layer. However, the coatings extend from the high-voltage output end to the ground-shielding means thereby establishing a resistive current as a second current to the environment on the outside of the insulation where the nonlinear voltage stress occurs that causes ionization at the terminus. The resistive current is linear, and, by design, is substantially larger in magnitude than the capacitive current. When both currents are added together, the resistive current overmasks the capacitive current, and consequently approaches a substantially linear current effect. As a consequence, a uniform voltage drop is established along the coated portion of the cable termination from the ground-shielding means to the high-voltage output end thereby substantially eliminating ionization in the cable termination.

Referring to the drawings wherein like reference numerals designate similar parts throughout, there is shown a coaxial cable of typical construction indicated generally by the numeral 10, such as might be adaptable for carrying a voltage load of 69 kv., or higher. The cable includes an inner metallic conductor 12 illustrated in the form of a stranded cable, which may be a compact strand, although it should be understood that the conductor 12 may comprise a solid conductor. Generally, a semiconducting layer 14 is applied around the metal-stranded conductor for the purpose of establishing a good electrical contact between the conductor and the insulation and further to shield out stresses thereby equalizing all stresses of the individual strands. The metal conductor, with a semiconducting layer applied thereon, is surrounded by a relatively thick insulating layer 16 which is usually applied by extrusion. The insulating material is typically a thermosetting plastic such as cross-linked polyethylene or ethylene-propylene rubber, which may be filled with mineral clay or other suitable fillers. Also, the cable includes a ground-shielding means comprising semiconducting layer or tape 18 and a metallic return shield 20, and, overlying this, is outer jacket 22 made of conventional material such as polyvinyl chloride.

Figure 2:
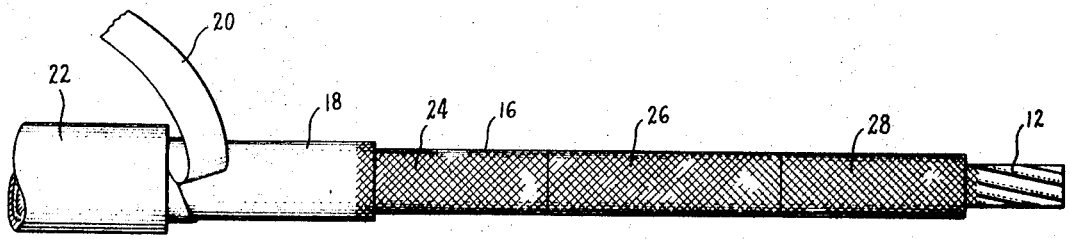
FIG. 2 is a side elevational view of a cable showing a terminating means falling within the scope of this invention.
Figure 3:
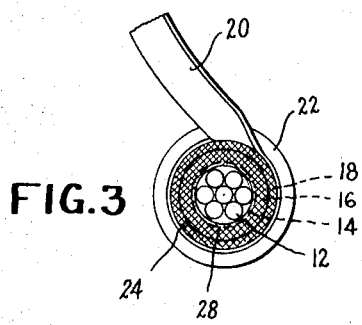
FIG. 3 is a front elevational view of the cable of FIG. 2.

FIG. 2 shows a terminating means prepared in accordance with the invention for an ionization level test. Outer jacket 22 is first stripped from the cable termination for a certain distance. The amount stripped will depend upon the termination length required, as explained hereinbelow, but there is no need to strip from the cable more than an inch or two of the jacket beyond the termination length. The copper shield or tape 20 is then unwound slightly more than the full distance of the termination length to expose the semiconducting layer, and, for ionization testing, the end of the tape is connected to ground. Next, the semiconducting layer 18 is removed substantially the full termination length leaving exposed insulation layer 16. As explained hereinbelow, this length typically is in the range of 18 to 48 inches. A small portion of the conductor 12 extends beyond the marginal edge of the insulation layer, and the semiconducting layer 14 is stripped from the exposed end of the conductor.

The termination length is then cleaned of dirt, grease, oil or other contaminants as by washing the termination with Vythene, carbon tetrachloride or other suitable solvent. After the solvent has dried, two or more semiconductive coatings, each having a different resistance per square, and described in greater detail hereinafter, are applied in a cascade arrangement without interruption to the termination length. The drawing illustrates three coatings 24, 26, and 28, and the cascaded coatings extend from the high-voltage output end (i.e. conductor) to the ground-shielding means and each coating is in contact with adjacent coatings in order to establish electrical contact with the shielding means. Each coating is applied over the circumference of the insulating layer 16 for approximately one-third the termination length, and coating 24 desirably extends about one-fourth inch over the circumference of the semiconducting layer 18 and coating 28 desirably extends about one-fourth inch over the conductor 12. The coatings may be applied by painting with a brush, spraying or any other suitable means, and are then permitted to dry as in air.

Coating 24 has the lowermost resistance per square and extends from the ground-shielding means for approximately one-third the termination length. The resistance per square for each coating progresses upwardly from the shielding means so that coating 26 has a value intermediate coatings 24 and 28. The difference in resistance per square between the coatings is chosen so that the voltage drop in the cascaded sections complement each other to provide the required voltage division for the termination. If the voltage drop between adjacent coatings is not sufficient, then the remaining coating (or coatings) must assume the difference in voltage drop and therefore may become overstressed which will cause overheating and failure. If the voltage drop between adjacent coatings is too large, or too small, there is a tendency toward one voltage drop along the termination length and therefore the invention would not be useful in providing termination means for cable having a voltage rating substantially above 35 kv. It should be understood, however, that the invention is not limited to the application of three coatings to the termination length, but rather the number of coatings depends upon such factors as the resistance per square values of the coatings employed, the voltage rating of the cable and the geometry of the cable.

In conducting the ionization level test, metallic shield 20 is connected to ground, and a cable lug, which is ionization free, is connected to the metal conductor at each terminus. At least one cable lug is connected electrically to the test equipment. Each cable, depending upon its class and size, must pass established standards with regards to ionization level. In a typical test procedure, voltage is applied to a cable to a high potential level as required by the standard, held there for 5 minutes, and then lowered gradually. If ionization occurs as observed on an oscilloscope or other suitable test apparatus, the voltage is lowered until it is found at what voltage ionization is extinguished. If this occurrence of ionization is at a potential above the required minimum, the cable is passed as satisfactory. Because of my invention, ionization at the terminals is substantially eliminated, and any ionization detected is therefore in the cable. If the cable passes the test, the cable terminations which had been used in the test procedure are cut off, and the remaining portion of the cable is then ready for shipment and installation.

In accordance with the invention, ionization or corona discharge is substantially precluded by grading the electrical stress sufficiently to maintain the stress along the termination length below the ionization start level of air. The ionization start level, regardless of cable size, is found from Paschen's law to be about 46 volts per mil (voltage calculated as root mean square), and therefore the total electrical stress along the termination length should be less than 46 volts per mil. The ionization start level depends on atmospheric conditions, e.g., humidity, temperature and barometric pressure, and therefore may vary by as much as about 3 volts per mil. The resistance electrical stress may be calculated from (1) the voltage load for which the cable is constructed to carry, (2) the circumference of the insulation, (3) termination length, and (4) the resistance per square of each coating.

In calculating the resistance electrical stress, the load-bearing characteristic and circumference of the insulation are set by the cable undergoing testing. The invention is applicable to cable adaptable to carry a voltage of substantially above 35,000 volts, e.g. 69,000 volts and higher. The circumference may vary depending on such factors as the type of insulation used, conductor size, and the like, and generally may have an insulation circumference ranging from about 4 inches to 10 inches. For example, a typical 69 kv. power cable, constructed as shown in FIG. 1 and having a mineral-filled cross-linked polyethylene insulating layer, may have a circumference around the insulation of about 7 inches.

The termination length may vary depending largely upon the cable size and voltage-load-bearing characteristic. As the length of the termination increases, it is necessary to increase the resistive current in order to achieve a linear voltage drop. The heat generated is proportional to the square of the current, and therefore a small increase in current can result in high heat losses. If the termination becomes too hot, arcing will occur between the metal conductor and metal shield which will short out the test equipment, i.e., high-potential transformer. On the other hand, if the termination is too short, arcing will occur through air between the conductor and metal shield. For conventional high-power cables, such as cable adaptable for carrying high-voltage loads of about 69 kv. and above, the termination length typically is from about 18 to 48 inches, but may be more or less depending on such factors as voltage load and circumference around the insulation. However, the termination length may be determined experimentally by one skilled in the art for each production specification of cable.

Each semiconductive coating is characterized by a resistance per square. Typical coatings useful for this invention include ultra-high-resistance paint comprising carbon black filler and an inert modified styrene resin as binder, and having a resistance per square of 10 to 10,000 megohms per square. The useful range for the resistance value of the coatings may vary depending primarily on the number of different coatings used, cable configuration, voltage and thermal conductivity of the insulation. In determining this range, cable configuration factors include the diameter and/or circumference of the metal conductor, the relation of the diameter across the insulation layer to the diameter of the metal conductor, and the mass of the insulation layer and metal conductor. The thermal conductivity of the insulation layer is significant in that the more conductive the insulation, the more heat will be absorbed by the conductor, which acts as a heat sink, and consequently the coating adjacent the ground-shielding means may have a relatively low resistance value. I have found, for example, for a 69 kv. cable with a 750 MCM conductor, having a circumference around the insulation of about 7.1 inches, and employing a 42 inch termination length cascaded in three sections of equal length, that the coating adjacent the ground-shielding means may have a resistance of as low as 10 megohms per square, the intermediate coating may be 30 megohms per square and the coating adjacent the conductor may be 100 megohms per square. If the resistance per square for any of the cascaded sections is too low for the cable, excess heating occurs causing a flashover. On the other hand, if the resistance per square for any of the cascaded sections is too high, then the capacitive current causes the voltage gradient to become sufficiently nonlinear and ionization along the termination can result. In the event the electrical stress or transverse voltage gradient along the termination length exceeds the ionization level of the cable, one or more coatings with a lower resistance per square should be employed. Generally, for terminating means falling within the scope of this invention, the electrical stress for typically high-voltage cable should be less than about 46 volts per mil, and for purposes of a safety factor I have found a stress of about 30 volts per mil to be particularly desirable. It should be understood, however, that in determining the electrical stress, atmospheric conditions must be taken into consideration (as explained above), and therefore this value may vary somewhat.

To further illustrate the invention, a section of a 69 kv. cable core having a 750 MCM compact round tinned copper conductor was tested on a balanced ionization level detector. In the cable construction, a semiconducting layer comprising ethylene-vinyl acetate and carbon black was extruded over the conductor at a wall thickness of 0.050 inch. An insulation layer was then applied comprising mineral filled cross-linked polyethylene, and had a wall thickness of 0.65 inch. Both terminations were coated in three 14 inch sections with semiconductive coatings. The coating adjacent and in contact with the ground-shielding means had a resistance per square of 10 megohms, the intermediate coating had a resistance per square of 30 megohms, and the coating adjacent and in contact with the conductor had a resistance per square of 100 megohms. Voltage was applied to the conductor through each termination. The total ionization of the cable under test was less than 2 pico-coulombs at twice the designed operating voltage (80 kv.). This shows that cable can be tested at high voltage levels without ionization occurring in the terminations.

The above test was repeated for a 138 kv. cable core having a 500 MCM conductor and an insulation wall thickness of 1 inch. The terminations were coated as described in the above example. The total ionization was slightly less than 2 pico-coulombs at 1.9 times the designed operating voltage (155 kv.).

High-voltage power cable is usually tested for power factor, capacitance and dielectric constant. In the conventional test procedure, the cable is provided with a wound tape termination, and the cable length is tested on a high-voltage Schering bridge, power factor bridge or other suitable bridges of similar design. In conducting such tests, the cable termination is provided with cascaded coatings in accordance with the present invention, and the cable tested on the bridge. This new termination is advantageous over the wound tape termination in that it not only provides a substantially ionization-free termination but further is a savings in time. In order to illustrate this application, a length of the 138 kv. cable described in the preceding example, and provided with the cascade-graded termination, was tested on a Schering bridge. The maximum applied voltage was 100 kv., which is a limit imposed by the test specification and insulation wall thickness and not the termination.

I claim:

1. Electric-cable-terminating means for substantially inhibiting ionization at the termini of said cable comprising an insulation layer surrounding a conductor and a ground-shielding means concentrically disposed over said insulation layer, said cable having a voltage rating substantially higher than 35,000 volts, the improvement which comprises: a plurality of semiconductive coatings applied in an electrically connected cascade arrangement on said insulation layer extending for a predetermined length from and in contact with the conductor at the high-voltage output end at each terminus to and in contact with said shielding means to establish electrical contact with said shielding means, said coatings having a substantially dominant linear current characteristic upon application of voltage, each of said coatings having a predetermined resistance per square different in value from an adjacent coating and cascaded progressively upward in value from said shielding means to said high-voltage output end so that the coating adjacent and in electrical contact with said shielding means has the lowermost value, the resulting cascaded coatings having a predetermined resistance per square sufficient so that the voltage gradient at the surface for said length does not exceed the ionization level of the coated termini of the cable.

2. Electric cable according to claim 1 wherein said coating adjacent and in electrical contact with said shielding means has a resistance of not less than about 10 megohms per square.

3. Electric cable according to claims 1 or 2 wherein the coating adjacent and in contact with the high-voltage output end has a resistance of not more than about 100 megohms per square.

4. Electric cable according to claims 1 or 2 wherein said predetermined length is from about 18 to 48 inches.

5. A method for determining ionization in a cable comprising an insulation layer surrounding a conductor and a ground-shielding means concentrically disposed over said insulation layer, said cable having a voltage rating substantially higher than 35,000 volts, which comprises: applying a plurality of semiconductive coatings in an electrically connected cascade arrangement for a predetermined length on said insulation layer from and in contact with the conductor at the high-voltage end at each terminus to and in contact with said shielding means to establish electrical contact with said shielding means, said coatings having a substantially dominant linear current characteristic upon application of voltage, each of said semiconductive coatings having a predetermined resistance per square different in value from an adjacent coating and cascaded progressively upward in value from said shielding means to said high-voltage output end so that the coating adjacent and in electrical contact with said shielding means has the lowermost value, the resulting cascaded coatings having a predetermined resistance per square sufficient so that the voltage gradient at the surface for said length does not exceed the ionization level of the coating termini of the cable, and subsequently applying voltage to said cable to measure ionization in said cable.

6. A method according to claim 5 wherein said coating adjacent and in electrical contact with said shielding means has a resistance of not less than about 10 megohms per square.

7. A method according to claims 5 or 6 wherein the coating adjacent and in contact with the high-voltage output end has a resistance of not more than about 100 megohms per square.

8. A method according to claims 5 or 6 wherein said predetermined length is from about 18 to 48 inches.